June 20, 1961 L. M. SMITH 2,989,651

TRANSISTOR PULSE GENERATOR

Filed Dec. 31, 1957

INVENTOR
L. M. SMITH

BY Walter M. Hill

ATTORNEY

United States Patent Office 2,989,651

Patented June 20, 1961

2,989,651
TRANSISTOR PULSE GENERATOR

Larrabee M. Smith, Morris Plains, N.J., assignor to Bell Telephone Laboratories, Incorporated, New York, N.Y., a corporation of New York Filed Dec. 31, 1957, Ser. No. 706,332
7 Claims. (Cl. 307—88.5)

This invention pertains to pulse generation, and particularly to means for stabilizing the duration of pulses produced by a transistor pulse generator.

Pulse generators for producing pulses of predetermined duration in response to initiating trigger pulses are widely used in digital counting and computing systems and in radar equipment. From the standpoint of simplicity of construction and economy of operation, a particularly advantageous circuit for this purpose comprises a single transistor of the type having a current gain exceeding unity. With appropriate associated circuitry, such as transistor can be caused to exhibit a negative resistance characteristic at its terminals. A trigger pulse applied to one of the terminals will then initiate regenerative switching of the transistor from a quiescent operating state to a temporary stable operating state. After a time dependent on the associated circuitry and on its internal characteristics, the transistor will regeneratively revert to its quiescent state. Since the voltage at the output terminal of the transistor differs in the two operating states, an output pulse is produced having a duration determined by the time for reversion to the quiescent state to occur. A complete description of the three basic types of such monostable transistor pulse generators, corresponding to triggering at the base, the emitter or the collector, is given in the article "Transistors in Switching Circuits" by A. E. Anderson, appearing on pages 1541–1562 of the Transistor Issue of the Proceedings of the I.R.E. for November, 1952.

The transistor characteristics which determine the time for it to revert to the quiescent state from the temporarily stable state are its dynamic current gain and its saturation current. The former quantity ($\alpha$) is the ratio of the change in collector current produced by a change in emitter current, and varies considerably with different transistors even though they may be constructed as nearly alike as possible. The saturation current ($I_{co}$) is the collector current which exists when there is no emitter current. It varies over a wide range for different transistors and with ambient temperature for the same transistor. Accordingly, the duration of the output pulse produced by a transistor regenerative pulse generator is a highly variable quantity.

An object of this invention is to provide a transistor regenerative pulse generator which will produce output pulses of stabilized duration.

A further object is to provide a transistor regenerative pulse generator wherein the output pulse duration is stabilized against variations in transistor saturation current.

A further object is to provide a transistor regenerative pulse generator wherein the output pulse duration is stabilized against variations in the current gain of the transistor.

A further object is to provide a transistor regenerative pulse generator wherein the output pulse duration is stabilized against variations in both the saturation current and the current gain of the transistor.

In one embodiment the invention is applicable to a grounded emitter type of transistor regenerative pulse generator which exhibits a negative resistance characteristic at its base terminal. A saturable reactor is connected between the base and emitter. A trigger pulse applied to the base causes the transistor to turn "on," resulting in an output pulse at the collector and producing a continuously increasing base current. This causes the reactance of the reactor to decrease, so that the base current increases at an increasing rate until it reaches a critical cutoff level at which it returns the transistor to the nonconducting or "off" state, terminating the output pulse. Because of the rapid rate of increase of the base current as it approaches that value, considerable variation in the cutoff level due to variations in the current gain of the transistor may occur without producing much variation in the duration of the output pulse. To take the fullest advantage of this behavior, the saturable reactor may be one having a substantially square hysteresis loop. In that case, the base current will increase so sharply after reaching a value at which the reactor saturates that the duration of the output pulse produced at the collector will be virtually independent of the characteristics of the transistor.

Another aspect of the invention involves stabilizing the duration of the output pulse produced by a transistor regenerative pulse generator against variations in transistor saturation current ($I_{co}$). To accomplish this, the base of the transistor is inductively coupled to an auxiliary circuit wherein a current is established equal to the difference between a fixed current value and the value of $I_{co}$. When the transistor is triggered to the temporarily stable "on" state, the change in voltage at its collector back-biases a diode connected in the auxiliary circuit, thus suddenly interrupting the current therein. This induces a substantially equal current flow at the base of the transistor, so that the total base current at the instant of triggering is maintained constant regardless of the actual value of $I_{co}$.

A more detailed description of the invention is presented in the following specification and accompanying drawings, in which.

Figure 7:
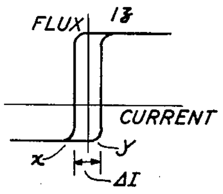
Figure 4:
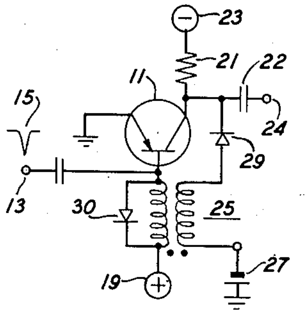
FIG. 4 is a circuit drawing of a transistor regenerative pulse generator wherein the output pulse duration is stabilized in accordance with the invention against variation in transistor saturation current.
Figure 8:
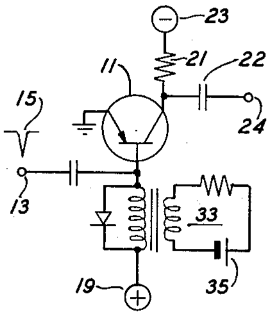
Figure 6:
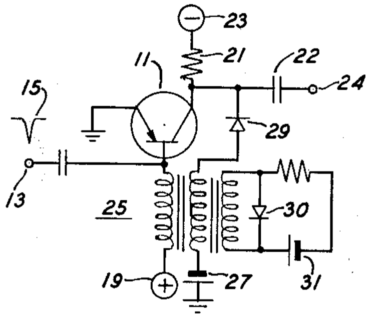

FIG. 6 is a circuit drawing of a transistor regenerative pulse generator similar to that of FIG. 4, but also including provision for using a saturable magnetic core to achieve still further stabilization of the duration of output pulses produced thereby; and FIG. 8 is a circuit drawing of a transistor regenerative pulse generator with a saturable transformer in its base circuit which possesses a square loop hysteresis characteristic of the type shown in FIG. 7.

Figure 1:
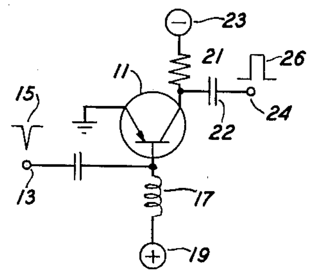
FIG. 1 is a circuit drawing of a grounded emitter transistor regenerative pulse generator exhibiting a negative resistance characteristic at its base terminal.

The circuit of FIG. 1 shows a conventional grounded emitter transistor regenerative pulse generator comprising a type *n* point contact transistor 11 having a trigger pulse input terminal 13 capacitively connected to its base for receiving negative trigger pulses such as pulse 15. The emitter of transistor 11 is grounded, and the base is connected by a linear inductor 17 to a source 19 of positive direct voltage with respect to ground. The collector is connected by a resistor 21 to a source 23 of negative direct voltage with respect to ground. Output pulses are produced at the collector and are conveyed through a blocking capacitor 22 to output terminal 24. Due to the positive bias of the base with respect to the emitter virtually no emitter current flows in the normal operating state. Some saturation current $I_{co}$ will flow from the base to the collector, causing the collector potential to be slightly more positive than the voltage of source 23. Transistor 11 is then in the non-conducting, or "off" state.

If now a negative pulse 15 is applied to input terminal 13, suddenly reducing the base voltage, the current flow between that electrode and the collector will at first decrease. This is clearly indicated by the curve in FIG. 2, which shows the relationship between the voltage and current at the base of transistor 11. Point "P" on that curve corresponds to the conditions at the base of transistor 11 before the trigger pulse occurs. The effect of the trigger pulse corresponds to a movement from point "P" downward along the upper branch of the curve. Since the emitter current still remains substantially zero, this branch of the curve corresponds to the "cutoff" operating condition of transistor 11. However, if pulse 15 is sufficiently negative to reduce the voltage at the base of transistor 11 to a level slightly below ground, corresponding to point (*j*) on the curve in FIG. 2, current will begin to flow from the emitter to the collector. Since inductor 17 prevents the current flowing therein from changing instantaneously, the resultant increase in collector current is virtually all fed back to the emitter to produce a still further increase in collector current. A very rapid regenerative feedback operation thereby occurs, ceasing only when a further increase in emitter current no longer produces a further increase in collector current. Transistor 11 will then be in the saturated or "on" state, the large collector current causing the voltage at that terminal to rise virtually to ground. In addition, the voltage at the base will be held at a negative level by the small base-to-emitter impedance which exists when the transistor is "on." This operation corresponds to a vertical drop from point (*j*) to point (*k*) on the lower branch of the curve in FIG. 2. After the trigger pulse terminates, since inductor 17 still holds the current flowing therein constant, the base current will immediately return to the same value as it had at point (P) on the upper branch of the curve in FIG. 2. Consequently, the changed operating condition of transistor 11 due to the trigger pulse corresponds to a vertical drop from point (P) to point (*q*) on the lower branch of the curve in FIG. 2. The lower branch therefore defines the "on" condition of transistor 11. It is evident therefrom that while the transistor is in the "on" state the voltage at the base remains negative. In addition, the initial base current which flows after the trigger pulse terminates and the transistor is "on" is substantially equal to the saturation current $I_{co}$ which existed just before that event occurred.

Immediately following the foregoing operation, the voltage difference it produced across inductor 17 causes an increasing current to begin to flow from source 19 through that element into the base of transistor 11. The rate of increase of that current with time will be roughly proportional to the voltage of source 19. This corresponds to movement along the lower branch of the curve in FIG. 2 from point (*q*) toward point (*m*). The increasing base current necessarily reduces the emitter current of transistor 11 because when the latter is fully "on," in the saturated state, no further increase in collector current is possible. However, the reduction in emitter current reduces the degree of saturation of the transistor, so that the base current finally reaches a critical value at which the slightest further increase thereof causes a drop in emitter current which results in a still large drop in collector current. This critical value of base current depends on the value of the current gain ($\alpha$) of transistor 11. Since the presence of inductor 17 again prevents an instantaneous change in base current, the decreased collector current necessitates a still further reduction in emitter current, so that a regenerative feedback operation occurs which ends with the emitter current being completely cut off and the collector current being at a relatively low value equal to the base current. This corresponds to a sudden jump from point (*m*) on the lower branch of the curve in FIG. 2 to point (*n*) on the upper branch thereof. Transistor 11 is then back in the "off" state, the voltage at its collector having dropped back nearly to the voltage of source 23. In addition, the base voltage becomes highly positive as a result of the voltage induced across inductor 17 in a direction tending to maintain the existing base current unchanged. This voltage then drops exponentially with time, reducing both the base and collector currents, until the operating conditions at the base again correspond to point "P" on the upper branch of the curve in FIG. 2. The circuit is then back in its initial quiescent "off" state, and the complete output pulse produced at terminal 24 will be substantially as shown by waveform 26 of FIG. 1.

Figure 2:
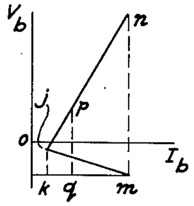
FIG. 2 is a curve showing the relationship between the base voltage and base current of the transistor in the circuit of FIG. 1.

From the foregoing description of the operation of the circuit of FIG. 1 it is apparent that a variation in either the current gain ($\alpha$) or the saturation current ($I_{co}$) of transistor 11 will affect the time required for it to revert to the "off" state after having been triggered "on." Since both $\alpha$ and $I_{co}$ vary from transistor to transistor and with temperature for a given transistor, considerable variation in the duration of the output pulse produced at output terminal 24 can occur. This may be analyzed by assuming that the base resistance of transistor 11 is zero, so that while it is "on" the voltage at the base remains constant at a negative value $V_b$. Since the slope of the lower branch of the curve in FIG. 2 is quite small, this assumption is a good approximation to the actual situation. Denoting the voltage of source 19 as $V_{bb}$, the inductance of inductor 17 as L, the base current as $I_b$, and time as *t*, summation of the voltages between the base of transistor 11 and ground leads to the result $$I_b = I_{co} + \frac{V_{bb} - V_b}{L} t \qquad (1)$$

Figure 3:
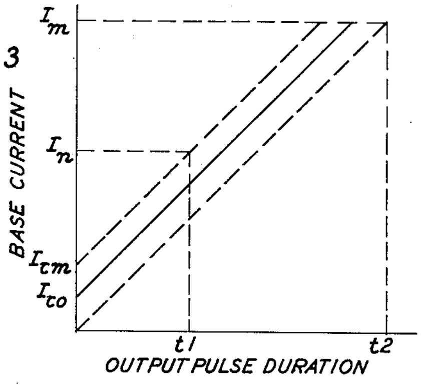
FIG. 3 is a series of curves showing how variations in the current gain and saturation current of the transistor in the circuit of FIG. 1 affect the duration of the output pulses produced thereby.

The linear relationship expressed by Equation 1 has been plotted as the solid line in Fig. 3. The transistor turns "off" when $I_b$ reaches a critical value at which the emitter current becomes zero. Denoting the collector current as $I_c$, this value of $I_b$ is given by $$I_b = \frac{\alpha - 1}{\alpha} I_c \qquad (2)$$

Substituting this in Equation 1, the "cutoff" time T for the base current to rise from its initial value $I_{co}$ to the critical value given by Equation 2, which will also be the duration of the output pulse at terminal 24, is $$T = \left(\frac{\alpha - 1}{\alpha} I_c - I_{co}\right)\left(\frac{L}{V_{bb} - V_b}\right) \qquad (3)$$

Equation 3 clearly shows the effect on T of variations in $I_{co}$ and $\alpha$. Assuming that $\alpha$ and $I_{co}$ each lie within some maximum range of toleranaces, the value of $$\frac{\alpha - 1}{\alpha} I_c$$

which is the critical value of $I_b$, will be a maximum when $\alpha$ is a maximum and will be a minimum when $\alpha$ is a minimum. In FIG. 3 the maximum critical value of $I_b$ has been shown as $I_m$, and the minimum value as $I_n$. In addition, assuming that $I_{co}$ may vary from about zero to a value $I_{cm}$ roughly twice its normal value, the relationship expressed by Equation 1 has been plotted as the lower dotted line for the former case and as the upper dotted line for the latter case. It is apparent therefore that the output pulse duration will be a minimum when the critical value of $I_b$ is equal to $I_n$ and $I_{co}$ is equal to $I_{cm}$. The output pulse will then terminate at time $t_1$. The output pulse duration will be a maximum when the critical value of $I_b$ is equal to $I_m$ and $I_{co}$ is zero. The output pulse will then terminate at time $t_2$. The difference between $t_1$ and $t_2$ is the range of possible variation in output pulse duration of the circuit of FIG. 1.

In order to stabilize the output pulse duration of the circuit of FIG. 1 against variation due to variations in transistor saturation current ($I_{co}$), applicant has devised the modification of that circuit shown in Fig. 4. This is similar to the circuit of FIG. 1, corresponding elements having the same reference numerals. However, instead of connecting the base of transistor 11 to source 19 by an inductor 17, it is connected thereto by the secondary winding of a transformer 25 having a turns ratio equal to unity. A diode 30 is connected in shunt with the secondary winding, poled to conduct in a direction opposing the voltage of source 19. One terminal of primary winding of transformer 25 is connected to the negative terminals of a battery 27 which is grounded at its positive terminal. The other primary winding terminal is connected by a diode 29 to the collected of transistor 11, the diode being poled to conduct in a direction toward the collector. Battery 27 provides a constant direct voltage of a magnitude which is less than that of source 23 by an amount at least equal to the voltage drop which would be produced across resistor 21 by the maximum value of saturation current ($I_{cm}$) of transistor 11. Accordingly, if the actual saturation current ($I_{co}$) should be smaller than $I_{cm}$, a current equal to the difference will flow from battery 27 through the primary winding of transformer 25, diode 29, resistor 21, and source 23 to ground. Capacitor 22 will prevent that current from flowing to a load which may be connected to output terminal 24.

When a trigger pulse 15 is applied to input terminal 13 to cause transistor 11 to turn "on," as described above with reference to the circuit of FIG. 1, the voltage at the collector of the transistor sharply rises nearly to ground. This renders diode 29 nonconducting, thus effectively open-circuiting the primary winding of transformer 25. Since the current which had been flowing in that winding had established a magnetic field linking the secondary winding, and since that field cannot instantaneously collapse, a current is induced in the secondary winding having an initial value very nearly the same as that of the current which had been flowing in the primary winding. The total current which flows in the secondary winding at the instant transistor 11 turns "on" is therefore the sum of the actual saturation current ($I_{co}$) plus the amount by which $I_{co}$ is exceeded by $I_{cm}$. This total of course, will simply be equal to $I_{cm}$ regardless of what the actual value of $I_{co}$ may be. Consequently, reference to Equation 3 above shows that the output pulse duration at the collector will be independent of variations in $I_{co}$. Of course, this would also be true if the current established in the primary winding of transformer 25 prior to the occurrence of trigger pulse 15 had any constant value exceeding $I_{cm}$. That is, while the voltage of battery 27 must be small enough to permit a current equal to $I_{cm}—I_{co}$ to flow through the primary winding of transformer 25 and diode 29, it may be still smaller.

When transistor 11 turns "on," a pulse is produced at output terminal 24 and the current flowing through the secondary winding of transformer 25 increases with time in the same manner as described above in the case of the circuit of FIG. 1. When the base current reaches a critical value transistor 11 will be turned "off." At that time the base voltage tends to rise sharply. If this occurred, it would induce a voltage across the primary winding of transformer 25 which would be coupled through diode 29 to the collector of transistor 11 and through capacitor 22 to output terminal 24. Diode 30 prevents such behavior by clamping the maximum voltage at the base of transistor 11 to the voltage of source 19. This is small relative to the voltage of source 27 connected to the collector through the primary winding of transformer 25 and diode 29, and so is also small relative to the amplitude of the output pulse at terminal 24. Consequently, the voltage at the collector remains substantially at the voltage of battery 27 after transistor 11 turns "off," and the voltage at output terminal 24 remains at zero. Diode 30 further provides a discharge loop for dissipating the current in the secondary winding of transformer 25 when transistor 11 turns "off." To accentuate this damping effect, in some cases it may be desirable to provide added resistance in series with diode 30.

Figure 5:
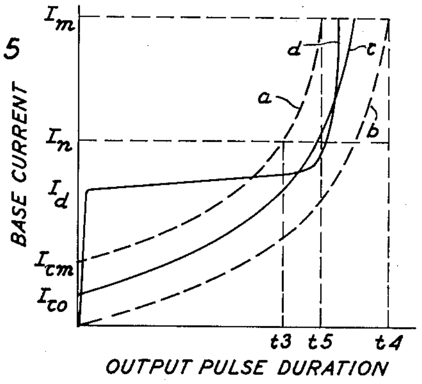
FIG. 5 is a series of curves showing how variations in the duration of output pulses produced by a transistor regenerative pulse generator may be stabilized against variations in transistor current gain and saturation current through the use of a saturable magnetic core in accordance with the invention.

Considering now the problem of stabilizing the duration of the output pulses produced by the circuit of FIG. 1 against variations in the current gain ($\alpha$) of transistor 11, in accordance with applicant's invention inductor 17 in that circuit may be provided with a saturable magnetic core. This combination of the core and the winding linking it is known as a "saturable reactor," and has the characteristic that its inductance decreases as the current through its winding increases. As a result, after transistor 11 turns "on" the increase in its base base current with time will be as shown by curve ($c$) in FIG. 5. That curve is drawn for the same value of transistor saturation current $I_{co}$ as the solid line characteristic in FIG. 3. For a value of $I_{co}$ twice as large or equal to $I_{cm}$, the corresponding relationship between base current and time in FIG. 5 will be as shown by curve ($a$). On the other hand, for a value of $I_{co}$ equal to zero the relationship will be as shown by curve ($b$). The maximum and minimum levels of critical base current at which transistor 11 turns "off" are shown in FIG. 5 as $I_m$ and $I_n$, respectively, the same as in FIG. 3. As described above with reference to FIG. 3, transistor 11 will produce an output pulse of minimum duration when $I_{co}$ is equal to $I_{cm}$ and the critical value of base current is equal to $I_n$. That time is shown as $t_3$ in FIG. 5. The maximum output pulse duration will occur when $I_{co}$ is zero and the critical value of base current is $I_m$. That time has been denoted $t_4$ in FIG. 5. It is apparent that the difference between $t_3$ and $t_4$ in FIG. 5 is smaller than the difference between the corresponding times $t_1$ and $t_2$ in FIG. 3, so that the use of a saturable reactor in place of a linear inductor in the base circuit of transistor 11 reduces the amount of variation in output pulse duration caused by variations in the current gain of transistor 11.

The foregoing principle may be applied to the circuit of FIG. 4 by providing transformer 25 thereof with a saturable magnetic core. In that case, since the initial base current of transistor 11 when it is turned "on" will always be equal to $I_{cm}$, the maximum possible variation in output pulse duration will extend over the range from $t_3$ to $t_5$ in FIG. 5. This, of course, is a considerable improvement over the range from $t_3$ to $t_4$ which exists when $I_{co}$ is not stabilized. However, there is a caution to be observed in the use of this circuit when the core of transformer 25 has a definite bend or "knee" in its saturation characteristic. If the secondary winding current level at which the inductance of that winding begins to drop rapidly as a result of core saturation should be roughly equal to $I_n$, a relatively small variation in the critical value of base current for producing "turn-off" of transistor 11 might cause a larger variation in output pulse duration than would occur if transformer 25 did not have a saturable core. This possibility is completely circumvented by the circuit of FIG. 6, which includes all elements of the circuit of FIG. 4 but further includes a tertiary winding linking the core of transformer 25 and connected by a current-limiting resistor to a direct voltage source 31. A direct bias current is thereby established in the tertiary winding to pre-magnetize the core of transformer 25 so that it reaches the "knee" of its saturation characteristic before the current in the secondary winding (which is connected to the base of transistor 11) reaches the level of $I_n$. In this circuit diode 30 has been connected across the tertiary winding of transformer 25 rather than across the secondary winding as in the circuit of FIG. 4. Since all windings are closely coupled, diode 30 serves the same function as in FIG. 4 regardless of which winding it shunts.

A still further improvement in stabilization of the output pulse duration of the circuit of FIG. 1 may be achieved by replacing inductor 17 therein which a properly biased saturable transformer possessing a substantially square hysteresis loop of the type shown in FIG. 7. A wide variety of transformer core materials having this hysteresis characteristic are available, one of the most popular being known in the art as Mumetal. A circuit of this type is shown in FIG. 8, wherein the base of transistor 11 is connected to voltage source 19 by the secondary winding of a saturable transformer 33 which has its primary winding in series with a current-limiting resistor and a direct voltage source 35. A bias current is thus established in the primary winding in a direction which saturates the core of transformer 33 in a direction opposite to that in which the transistor saturation current $I_{co}$ flowing in the secondary winding of the transformer tends to saturate it. Thus, on the hysteresis loop in FIG. 7, the operating point of the core of transformer 33 will lie on the lower branch of the loop at or to the left of point "*x*."

The bias current must be at least equal to the sum of the saturation current $I_{co}$ of transistor 11 plus $$\frac{\Delta I}{2}$$

where $$\frac{\Delta I}{2}$$

is the negative current in FIG. 7 corresponding to operation at point "*x*." The existence of this relationship may be assured by setting the bias current equal to the sum of $$\frac{\Delta I}{2}$$

plus the maximum value $I_{cm}$ which $I_{co}$ may reach. Part of the bias current will then always balance $I_{co}$, and the remainder will establish the required core flux.

The inductance of the secondary winding of transformer 33 is virtually zero when its core is saturated. Consequently, when a trigger pulse 15 is applied to terminal 13 of the circuit of FIG. 8 to turn transistor 11 "on," the current which flows into the transistor base through the secondary winding of transformer 33 sharply increases. The flux established by this current in the transformer core will be in a direction opposing that established by the bias current in the primary winding, so that the core immediately desaturates. Under these circumstances the inductance of the secondary winding of transformer 33 becomes very large, maintaining the current flow therein constant at a value $I_d$ equal to ΔI plus the difference between the maximum value and the actual value of the saturation current $I_{co}$ of transistor 11. This corresponds to operation of the core of transformer 33 at point "*y*" on its hysteresis loop of FIG. 7. After a definite time the voltage difference existing across the secondary winding of transformer 33 will cause its core to saturate, thereby reaching point "*z*" on the hysteresis loop in FIG. 7. The inductance of the winding then again becomes very small, permitting the current flowing therein and into the base of transistor 11 to rise almost instantaneously from $I_d$ to the critical value at which transistor 11 turns "off." This behavior is illustrated by solid curve "*d*" of FIG. 5. It is apparent from this curve that variation of the critical value of base current between its minimum and maximum values $I_n$ and $I_m$ has practically no effect on the output pulse duration of the circuit of FIG. 8 so long as the current $I_d$ in the secondary winding of transformer 33 before its core saturates is less than $I_n$. This relationship will be assured if the value of ΔI, which is the width of the hysteresis loop in FIG. 7, is sufficiently narrow. Since the width of the hysteresis loop depends on the material and dimensions of the transformer core and on the number of turns of the secondary winding thereon, those parameters may be selected to attain the described condition.

It is evident from curve (*d*) of FIG. 5 that the value of the transistor saturation current $I_{co}$ flowing in the secondary winding of transformer 33 while transistor 11 is "off" has no effect on the duration of the output pulse produced at terminal 24. This is because the pulse duration depends solely on the time required to bring the transformer core from saturation in one direction to saturation in the opposite direction, in accordance with the relationship $$T=\frac{N\phi}{V_{bb}-V_b} \tag{4}$$

In this equation N is the number of turns of the secondary winding of transformer 33, $\phi$ is the flux level at which the transformer core saturates, $V_{bb}$ is the voltage of source 19 and $V_b$ is the voltage existing at the base of transistor 11 in the "on" state. The value of $\phi$ is determined by the cross-sectional area and magnetic permeability of the core, and increases as either of those parameters increase. A desired output pulse duration can therefore be achieved by appropriate selection of the value of N or $V_{bb}$, or by choosing a core having the saturation flux level required by Equation 4. Of course, since the saturation current $I_{co}$ of transistor 11 affects the current which exists at its base in the "off" state, variations in $I_{co}$ affect the magnitude of the current which a "turn-on" trigger pulse at input terminal 13 must provide. For this reason, it may be advantageous in some cases to stabilize the required trigger pulse magnitude by using a circuit such as that of FIG. 6 with a saturable transformer 25 having a square hysteresis loop of the kind shown in FIG. 7.

While the invention has been described in terms of various specific embodiments incorporating it, it will be evident to those skilled in the art of transistor pulse circuitry that many modifications and variations thereof may be devised without departing from the scope and teachings of the invention. In particular, since the only essential requirement of a transistor for use with the invention is that it possess a negative resistance characteristic as described, either a type *n* or type *p* point contact transistor, or the "hook" transistor well known in the art, may be used.

What is claimed is:

1. A pulse generator comprising a transistor having an emitter, a collector and a base, a resistor having a pair of terminals of which one is connected to said collector, means for applying a collector supply voltage between said emitter and the other terminal of said resistor, a transformer having a saturable magnetic core, said transformer further having a primary winding and a secondary winding and a tertiary winding respectively wound on said core and respectively having a pair of terminals, means for connecting one terminal of said secondary winding to said base, means for applying a base supply voltage between said emitter and the other terminal of said secondary winding to cause said transistor to normally assume an "off" state wherein a saturation current having a maximum value $I_{cm}$ flows between said base and said collector through said secondary winding and said resistor, means for momentarily changing the voltage between said base and said emitter to cause said transistor to assume an "on" state wherein current flows between said emitter and collector and produces an increasing current flow between said base and said collector through said secondary winding, said transistor being so constructed that it reverts from the "on" to the "off" state when the current flow between said base and collector reaches a critical level having a minimum value $I_n$, diode means connecting one terminal of said primary winding to said collector, a source of bias voltage having a value less than that of said collector supply voltage by an amount at least equal to the product of $I_{cm}$ and the resistance of said resistor, means for connecting said source of bias voltage between the other terminal of said primary winding and said emitter, and means connected between the terminals of said tertiary winding for establishing a current therein which pre-magnetizes said transformer core so that it becomes substantially saturated when the current in said secondary winding reaches a value no greater than $I_n$.

2. The pulse generator of claim 1, further including a second diode connected in shunt with one of said transformer windings, said second diode being conductive in the direction of the voltage which is produced across the winding it shunts when said transistor reverts to its "off" state.

3. A pulse generator comprising a transistor having an emitter, a collector and a base, a resistor having a pair of terminals of which one is connected to said collector, means for applying a collector supply voltage between said emitter and the other terminal of said resistor, a transformer having a saturable magnetic core possessing a substantially square hysteresis loop, said transformer further having a primary winding and a secondary winding and a tertiary winding wound on said core and respectively having a pair of terminals, means for connecting one terminal of said secondary winding to the base of said transistor, means for applying a base supply voltage between the other terminal of said secondary winding and said emitter to cause said transistor to normally assume an "off" state wherein a saturation current having a maximum value $I_{cm}$ flows between said base and collector through said secondary winding and said resistor, means for momentarily changing the voltage between said base and emitter to cause said transistor to assume an "on" state wherein current flows between said emitter and collector and produces an increasing current flow between said base and said collector through said secondary winding, said transistor being so constructed that it reverts from said "on" to said "off" state when the current flow between said base and collector reaches a critical level having a minimum value $I_n$, diode means connecting one terminal of said primary winding to said collector, a source of bias voltage having a value less than that of said collector supply voltage by an amount at least equal to the product of $I_{cm}$ and the resistance of said resistor, means for connecting said source of bias voltage between the other terminal of said primary winding and said emitter, and means connected across the terminals of said tertiary winding for establishing a current therein which pre-saturates said transformer core so that it becomes unsaturated when the current in said secondary winding reaches a value no greater than $I_n$.

4. A pulse generator comprising a transistor having an emitter, a collector and a base, a resistor having a pair of terminals of which one is connected to said collector, means for applying a collector supply voltage between said emitter and the other terminal of said resistor, a transformer having a primary winding and a secondary winding, said secondary winding having a pair of terminals of which one is connected to the base of said transistor, means for applying a base supply voltage between said emitter and the other terminal of said secondary winding to cause said transistor to normally assume an "off" state wherein a saturation current having a maximum value $I_{cm}$ flows between said base and said collector through said secondary winding and said resistor, means for momentarily changing the voltage between said base and said emitter to cause said transistor to assume an "on" state wherein current flows between said emitter and collector and produces an increasing current flow between said base and collector through said secondary winding, diode means connecting one terminal of said primary winding to said collector, a source of bias voltage having a value less than that of said collector supply voltage by an amount at least equal to the product of $I_{cm}$ by the resistance of said load, and means for connecting said source of bias voltage between the other terminal of said primary winding and said emitter, whereby a current is established in said primary winding when said transistor is in the "off" state which is equal to the difference between a constant current value at least equal to $I_{cm}$ and the actual saturation current of said transistor.

5. The pulse generator of claim 4, further including a second diode shunting said secondary winding, said second diode being conductive in a direction opposite to that of the current which is established in said secondary winding by said base voltage.

6. A pulse generator comprising a transistor exhibiting a current gain greater than unity and having an emitter, a collector and a base, a resistor having a pair of terminals of which one is connected to said collector, means for applying a collector supply voltage between said emitter and the other terminal of said resistor, a transformer having a saturable magnetic core, said transformer further having a primary winding and a secondary winding respectively wound thereon, said secondary winding having a pair of terminals of which one is connected to the base of said transistor, means for applying a base supply voltage between said emitter and the other terminal of said secondary winding to cause said transistor to normally assume an "off" state wherein a saturation current having a maximum value $I_{cm}$ flows between said base and said collector through said secondary winding and said resistor, means for momentarily changing the voltage between said base and emitter to cause said transistor to assume an "on" state wherein current flows between said emitter and collector and produces an increasing current flow between said base and collector through said secondary winding, said transistor being so constructed that it reverts from said "on" state to said "off" state when the current flow between said base and collector reaches a critical level having a minimum value $I_n$, said magnetic core being so constructed that it becomes substantially saturated when the current in said secondary winding reaches a value no greater than $I_n$, diode means connecting one terminal of said primary winding to said collector, a source of bias voltage having a value less than that of said collector supply voltage by an amount at least equal to the product of $I_{cm}$ and the resistance of said resistor, and means for connecting said source of bias voltage between the other terminal of said primary winding and said emitter, whereby a current is established in said primary winding when said transistor is in the "off" state whch is equal to the difference between $I_{cm}$ and the actual saturation current of said transistor.

7. The pulse generator of claim 6, further including a second diode effectively shunting said primary winding, said second diode being conductive in a direction opposite to that of the current which is established by said source of bias voltage in said primary winding.

References Cited in the file of this patent

UNITED STATES PATENTS 2,772,357 An Wang ............... Nov. 27, 1956

(Other references on following page)

UNITED STATES PATENTS

| | | |
|---|---|---|
| 2,772,370 | Bruce | Nov. 27, 1956 |
| 2,798,169 | Eckert | July 2, 1957 |
| 2,848,613 | Green et al. | Aug. 19, 1958 |
| 2,857,518 | Reed | Oct. 21, 1958 |
| 2,873,371 | Van Allen | Feb. 10, 1959 |
| 2,877,360 | Moore et al. | Mar. 10, 1959 |
| 2,882,482 | Simkins | Apr. 14, 1959 |
| 2,915,710 | Schiewe et al. | Dec. 1, 1959 |

OTHER REFERENCES

Article, entitled, "The Transistor Regenerative Amplifier as a Computor Element," by Chaplin, Proc. of the Inst. of Elec. Eng., vol. 101, part III, No. 73, October 1954, pp. 298–307.

Article, entitled, "Transistors as On-Off Switches in Saturable-Core Circuits" by Bright, Pittman and Rover, Electrical Manufacturing, December 1954, pp. 79–82.